(12) United States Patent
Jouin et al.

(10) Patent No.: US 9,146,887 B2
(45) Date of Patent: Sep. 29, 2015

(54) AUTOMATING DIGITAL DISPLAY

(71) Applicant: Atmel Corporation, San Jose, CA (US)

(72) Inventors: Sebastien Jouin, La Chapelle-Launay (FR); Sylvain Garnier, Nantes (FR); Thierry Delalande, Nantes (FR); Romain Oddoart, Petit-Mars (FR)

(73) Assignee: Atmel Corporation, San Jose, CA (US)

( * ) Notice: Subject to any disclaimer, the term of this patent is extended or adjusted under 35 U.S.C. 154(b) by 86 days.

(21) Appl. No.: 13/692,531

(22) Filed: Dec. 3, 2012

(65) Prior Publication Data

US 2014/0089537 A1   Mar. 27, 2014

Related U.S. Application Data

(60) Provisional application No. 61/704,296, filed on Sep. 21, 2012.

(51) Int. Cl.
*G06F 3/00* (2006.01)
*G09G 3/36* (2006.01)
*G06F 13/32* (2006.01)

(52) U.S. Cl.
CPC . *G06F 13/32* (2013.01); *G09G 3/36* (2013.01)

(58) Field of Classification Search
CPC .................................. G06F 13/00; H04N 7/16
USPC ............................................................ 710/24
See application file for complete search history.

(56) References Cited

U.S. PATENT DOCUMENTS

| 5,900,886 A * | 5/1999 | Shay .............................. 345/691 |
| 2006/0184987 A1 * | 8/2006 | Allen et al. .................... 725/100 |

* cited by examiner

*Primary Examiner* — Titus Wong
(74) *Attorney, Agent, or Firm* — Fish & Richardson P.C.

(57) ABSTRACT

A device comprises a central processing unit (CPU), a display controller configured for controlling a digital display and a memory configured for storing data corresponding to the digital display. The device includes a direct memory access (DMA) controller configured for autonomously transferring the data from the memory directly to the display controller without CPU intervention.

22 Claims, 6 Drawing Sheets

AUTOMATING DIGITAL DISPLAY

CROSS-REFERENCE TO RELATED APPLICATIONS

This application claims the benefit of U.S. patent application No. 61/704,296 filed Sep. 21, 2012, the contents of which are incorporated herein by reference.

TECHNICAL FIELD

This disclosure relates generally to automating display of data on digital displays.

BACKGROUND

A digital display, when present in a computing system, is generally managed as a hardware peripheral module using a display controller. Typically, the display controller communicates with the central processing unit (CPU) and other master modules of the computing system for transferring data for presentation on the digital display.

SUMMARY

A computing system that includes a digital display managed by a display controller allows the display controller to interact directly with the DMA controller for automating the digital display. The system enables the DMA controller to transfer bitmaps or encoded characters to the display memory without involving the CPU. The system allows an autonomous mechanism for displaying symbols on the digital display. In addition, the system facilitates sequencing and/or scrolling character strings on the digital display without CPU intervention.

In one general aspect, a device comprises a central processing unit (CPU), a display controller configured for controlling a digital display and a memory configured for storing data corresponding to the digital display. The device includes a direct memory access (DMA) controller configured for autonomously transferring the data from the memory directly to the display controller without CPU intervention.

Particular implementations of the device may include one or more of the following features. The CPU may be configured to be idle or performing an activity unrelated to the digital display at a time when the DMA controller is transferring the data from the memory to the display controller.

The digital display may include a Liquid Crystal Display (LCD). The display controller may include an LCD controller.

The digital display may include symbols, a symbol comprising segments that are atomic elements of the digital display represented by a bitmap. The data included in a transfer may be associated with a bitmap corresponding to a symbol. The bitmap may include information on states of the segments comprising the symbol, a bit mask indicating a subset of the segments to be updated and an offset in display memory.

The state of a segment may indicate whether the respective segment is displayed on or displayed off. The display memory may comprise a bank of registers with each register associated with a segment. The offset may be used for selecting a subset of the registers and the bit mask is used for determining which of the selected subset of registers will be updated. The size of the offset may range from a few bits to several bytes. The number of DMA transfers from the memory to the display controller corresponding to a symbol may be based on a size of the symbol and an arrangement of segments included in the symbol.

The display controller may be configured for performing operations comprising measuring an amount of time using an internal counter. The operations may include determining whether the measured amount of time has exceeded a known threshold value. The operations also may include re-setting the amount of time to a zero value and sending a ready signal to the DMA controller based on determining that the measured amount of time has exceeded the known threshold value. The operations also may include receiving a predetermined amount of data from the DMA controller. In addition, the operations may include presenting on the digital display information corresponding to the predetermined amount of data received from the DMA controller.

The known threshold value may correspond to a display rate of the digital display. The DMA controller may be configured for performing operations comprising receiving the ready signal from the display controller and transferring an amount of data corresponding to the predetermined amount in a transfer cycle responsive to receiving the ready signal from the display controller.

The DMA controller may include an interface that is configured for stalling a transfer until the ready signal is received from the display controller. The DMA controller may be configured for receiving the ready signal from additional peripheral controllers. The DMA controller may be configured for transferring a total amount of data to be presented on the digital display in multiple transfer cycles when the total amount of data is greater than the predetermined amount transferred in a transfer cycle. The predetermined amount of data transferred in a transfer cycle may be based on a size of a DMA data bus that is used for the transfer.

The digital display may be configured to present a string of characters using a display mode that is one of a sequential mode and a scrolling mode. The string of characters may include an ASCII character. The data included in a transfer may correspond to the ASCII character. The display controller may be configured to translate the data corresponding to the ASCII character to a bitmap for the digital display using look-up tables included in the display controller.

The display controller may be configured to perform operations comprising determining whether the display mode is the sequential mode or the scrolling mode. Based on determining that the display mode is the sequential mode, the display controller may display characters comprising a subset of the string. The characters included in a displayed subset may be in sequence with the characters included in preceding displayed subsets.

The display controller is configured to perform operations comprising determining whether the display mode is the sequential mode or the scrolling mode. Based on determining that the display mode is the scrolling mode, the display controller may check a number of steps into which the digital display is divided. The number of steps may be based on a length of the string of characters and a size of the digital display. The display controller may repeat a display of the string of characters a number of times that is same as the number of steps. The information on the number of steps may be included in a configuration register associated with the display controller.

The display controller may be configured to perform operations comprising determining that the display mode is the scrolling mode. The display controller may obtain a number of steps into which the digital display is divided. The number of steps may be based on a length of the string of characters and a size of the digital display. The display controller may display successive sets of characters associated with the string, with each set repeating characters from the preceding set excluding an initial character included in the preceding set. The number of the successive sets may be same as the number of steps. A size of each set may be based on a size of the digital display.

The details of one or more disclosed implementations are set forth in the accompanying drawings and the description below. Other features, aspects, and advantages will become apparent from the description, the drawings and the claims.

DETAILED DESCRIPTION

Figure 1:
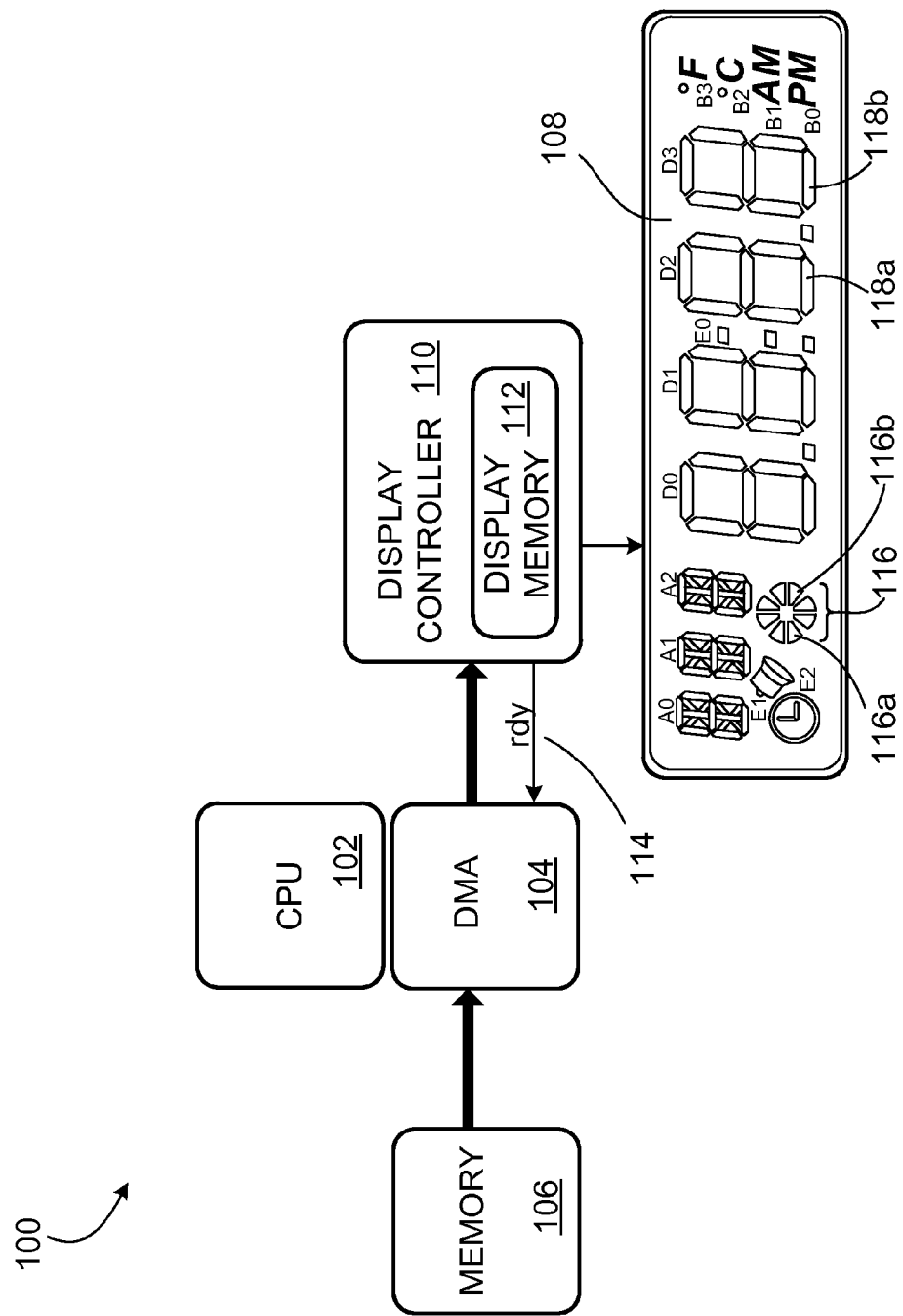
FIG. 1 is a conceptual block diagram of an exemplary computing system that manages data transfer for a digital display without CPU intervention.

In computing system architecture, a digital display is generally implemented as a peripheral hardware module that is configured for processing data in the form of binary digits ("bits") and displaying information based on the processed data. The operation of the digital display is managed by a display controller, which provides an interface between the digital display and various other modules of the computing system, such as the CPU and other master modules like the Direct Memory Access (DMA) controller. The display controller processes the data that is received for display and configures the hardware associated with the digital display for displaying the data.

The data that is to be displayed on the digital display is usually transferred by the DMA controller from the main or system memory to update a display memory that is included in the display controller. The data that is in the display memory is presented by the digital display.

Typically, the CPU controls the DMA controller, which is also referred to simply as the DMA, to transfer the data from the main memory to the display controller, which processes and provides the data to the display memory. The CPU may be fully occupied for the entire duration of the data transfer and display, and thus unavailable to perform other work. Therefore, the CPU processing resources are utilized and power is consumed by the CPU during operation of the digital display, even if the CPU may not be performing the display by itself. Situations where a large amount of data is to be displayed may use several transfer cycles to update the display memory, which may block the CPU resources for considerable time while consuming a large amount of power. Alternatively, if the data is to be displayed for a long time, even if the amount of data is small, the display will still need to be refreshed periodically, which may block the CPU bandwidth and consume considerable power.

It may be useful to design a computing system in which the digital display is automated. In this context, automating the digital display refers to providing a mechanism for transferring display data from the main memory to the display memory without CPU involvement during the transfer cycles. In such architecture, the CPU may be employed for performing other operations while digital display is autonomous, that is, works without CPU intervention, thereby increasing the throughput. Alternatively, the CPU may be idle or in a reduced activity state while the data is displayed, thereby lowering the power consumption of the computing system.

Some implementations embed additional logic in the display controller to automate periodic processing of data. However, such implementations increase the gate count of the display controller, thereby increasing the cost of the system, and the power consumed by the display controller.

A computing system or device may be designed to allow the display controller to interact directly with the DMA controller using a request/acknowledgement transfer mechanism for automating the digital display. Such a device may enable transferring bitmaps or encoded characters autonomously from the main memory to the display memory for displaying symbols on the digital display. In addition, such a device may provide hardware means to sequence and/or scroll strings of characters without CPU intervention on the digital display and offer a mechanism to automate static and periodic data streams.

FIG. 1 is a conceptual block diagram of an exemplary computing system 100 that manages data transfer for a digital display without CPU intervention. The computing system 100 includes a CPU 102, a DMA 104 and main or system memory 106. The computing system 100 also includes several peripheral components, such as a digital display 108. Associated with the digital display 108 is a display controller 110. The display controller 110 includes a display memory 112 and sends a signal 114 to the DMA 104. The digital display 108 displays data such as the symbol 116 representing a pinwheel, which includes segments 116a and 116b, and the digit symbols 118a and 118b, each of which include several segments.

The CPU 102 is a hardware component within the computing system 100 that is configured for executing the instructions of a computer program by performing the basic arithmetical, logical, and input/output operations of the system. In some implementations, the CPU is connected to all other hardware included in the system, such as the DMA 104, the memory 106, and the digital display 108 through the display controller 110.

In some implementations, the CPU 102 implements a reduced instruction set computer (RISC) instruction set architecture (ISA). For example, the CPU 102 may implement an Advanced RISC (ARM) instruction set, such that the CPU 102 is an ARM microcontroller. The CPU 102 may execute 32-bit instructions, 64-bit instructions, 128-bit instructions, or even higher sizes, such as 256-bit advanced vector extensions.

The DMA 104 is a hardware component within the computing system 100 that can generate memory addresses and initiate memory read or write cycles. The DMA 104 may be a central DMA system in the computing system 100, such as in an ARM microcontroller.

In some implementations, the DMA 104 allows some hardware modules within the computing system 100 to access the system memory independently of the CPU 102. In such implementations, the DMA 104 is able to transfer data autonomously between the shared system memory and peripheral hardware modules. In such implementations, the DMA 104 may be configured for transferring data from the memory 106 to the digital display 108 without involving the CPU 102, as described in greater detail in the following sections.

The memory 106 is a hardware component of the computing system 100 that stores data and instructions in memory cells that are indexed by memory addresses. The memory 106 may be any appropriate memory device, such as random access memory (RAM), including various types of RAM. In some implementations, the memory 106 may be read-only memory (ROM), including various types of a ROM such as an erasable programmable read-only memory (EPROM) or an EEPROM.

In some implementations, the memory 106 may be a shared RAM that is simultaneously accessible for reading and writing by different hardware components, including peripheral modules like the display controller 110. The CPU 102 and the DMA 104 may interface the memory 106 with other hardware modules and manage the transfer of data and instructions in and out of the memory 106.

The digital display 108 is a peripheral hardware module in the system 100 that is configured for projecting data onto an associated screen or hardware surface, such as a display glass. The digital display 108 may be used to display messages or other information. The digital display 108 may be any type of digital display with "pixels," which can be addressed through a two-dimensional array organization. For example, the digital display 108 may be a Liquid Crystal Display (LCD), a Light Emitting Diode (LED) display, or any other suitable display.

The display controller 110 is a hardware module that is configured for managing the digital display 108. The display controller 110 provides an interface for other hardware modules in the computing system 100 to interact with the digital display 108. The display controller 110 receives display data transferred from the memory 106, processes the data and displays the processed data to the digital display 108, such as the pinwheel 116, which includes symbols 116a and 116b, and the digits 118a and 118b.

The data projected by the digital display 108 is made up of one or more segments, which can be either visible or invisible. A segment is an atomic element of the digital display 108. In some implementations, such as in an LCD, a segment has two electrodes with liquid crystal between them. The electrodes may be referred to as the common terminal (COM) and the segment terminal (SEG), which is connected to a segment driver. When a voltage above a specified threshold voltage is applied across the liquid crystal, the segment becomes visible.

The state of a segment, that is, whether the segment is visible or invisible, may be determined based on the value of a bit corresponding to the segment in the display memory associated with the digital display 108. For example, if the bit value is 1, the segment may be visible; but if the bit value is 0, the segment may be invisible. The bit value, in turn, may be based on data that is transferred from the memory 106.

The display memory 112 is included in the display controller 110. The display memory 112 may be implemented as a RAM or a bank of registers. When implemented as a bank of registers, each flip-flop in the display memory may provide the state of one segment.

In some implementations, data is displayed by the digital display 108 in the form of symbols. For example, 116a and 116b may represent two symbols. In this context, a symbol is the association of several segments. Each symbol is represented by one or more symbol bitmaps, which provide the bit values for the associated segments for generating the symbol. A symbol bitmap may be looked upon as a table of bits that control the representation of the corresponding symbol.

In some implementations, the computing system 100 may animate the symbols on the digital display 108 by using a sequential mechanism. For example, the computing system 100 may animate the pinwheel 116 by "flashing" the symbols 116a, 116b, and the other symbols included in the pinwheel 116.

A symbol may be animated by updating the segments corresponding to the symbol at a given display rate, which is the rate at which the display controller 110 updates the display memory 112. The display rate is based on an internal counter overflow at the display controller 110. The segments are updated by updating the display memory 112 with the information from the symbol bitmaps.

Symbol bitmaps associated with a symbol are stored in the memory 106. The DMA 104 automates the transfer of the symbol bitmaps from the memory 106 to the display memory 112. The amount of data that can be transferred by the DMA 104, which is also known as the DMA throughput, is limited by the size of the data bus used by the DMA. In some implementations, the DMA 104 transfers a single symbol bitmap in one transfer cycle. In such implementations, for symbols that include several bitmaps, the DMA 104 transfers the bitmaps in several transfer cycles.

In the sequential mechanism, the DMA 104 is configured to transfer the symbol bitmaps repeatedly in sequence. The display controller 110 controls the transfers by the DMA 104 with 'rdy' signal 114 in order to pause data transfers according to display rate.

The DMA 104 transfers a symbol bitmap in one cycle when the signal 114 is high. After a transfer, the display controller 110 pulls the signal 114 low. The display controller 110 then waits for an amount of time, which is measured by an internal counter, to pull up signal 114 high again in order to initiate the next transfer from the DMA 104 for displaying the next bitmap. The amount of time that the display controller 110 waits is configurable by the user of the computing system 100.

In some implementations, the computing system 100 may update only a section of the digital display 108 by using an indirect access mechanism. For example, the digital display 108 may be associated with a clock for showing the time, and the display controller 110 may update only the digits 118a and 118b representing the minutes. The symbols corresponding to the digits 118a and 118b may be made up of several segments, which are updated based on the symbol bitmaps.

A symbol bitmap may be transferred by the DMA 104 in each transfer. The amount of data transferred in one transaction is limited by the size of the data bus used by the DMA. For example, the data bus may be 32 bits wide, and therefore, the DMA 104 may transfer 32 bits in one transfer. Since one transfer by the DMA may correspond to a symbol bitmap, the size of the symbol bitmap is also limited by the size of the data bus. For a 32-bit data bus, the symbol bitmap may be 32 bits, while for a 64-bit data bus the symbol bitmap may be 64 bits.

As described previously, the display memory 112 may be implemented as a bank of registers in which each flip-flop provides the state of one segment. In the indirect access mechanism, adjacent segments in the display memory may not be modified at the same time. The flip-flops may be organized in groups of size S that is based on the amount of data transferred by the DMA 104.

The data transferred by the DMA 104 for the indirect access mechanism uses several parameters for updating the segments. The parameters include the size S of a group of segments, a mask allowing update of a group of segments, and an offset in the display memory 112.

Performance efficiency may be achieved by transferring all the parameters in a single transfer. Therefore, the size S may be less than the data bus size. The size of the data mask may be same as the size S, and the offset may also be the same size. For a 32-bit data bus size, the size S may be 8 bits, the size of the data mask is also 8 bits and the offset is a byte (8 bit) offset. Therefore, 8 segments may be updated in one transfer cycle. For a 64-bit data bus size, S may be 16 bits, the size of the data mask is 16 bits and the offset also may be 16 bits. Therefore, 16 segments may be updated in one transfer cycle.

In some implementations, as an alternative to animating symbols on the digital display 108, or in addition to animating the symbols, the display controller 110 may be configured for displaying a string of characters on the digital display 108. In this context, a string of characters may be considered to include a single character, or more than one character. The characters may be encoded by any suitable encoding scheme. For example, the characters may be encoded using American Standard Code for Information Interchange (ASCII) codes, in which case the characters are referred to as ASCII characters. As another example, the characters may be encoded using Extended Binary Coded Decimal Interchange Code (EBCDIC) or Unicode.

The string of characters may be displayed in sequence, in which case the display may be considered a static data. Alternatively, the display controller 110 may scroll the string of characters on the digital display 108, in which case the display may be considered a periodic data stream. The display controller 110 may be configured to automate the display of the string of characters by interacting with the DMA 104 without intervention by the CPU 102.

In order for the digital display 108 to display one or more strings of characters, which are also referred to as character strings, the character strings are formatted and written to the memory 106. For example, the CPU 102 may format the character strings and store the formatted data in memory 106.

The DMA 104 may be configured to transfer the formatted data corresponding to the character strings to the display controller 110. The character strings may be formatted as codes corresponding to the characters, for example ASCII codes for ASCII characters. The DMA 104 transfers the character codes as bits to the display controller 110. For example, for the character 'A,' which represents a particular letter of the English alphabet in uppercase, the corresponding ASCII code in binary is '01000001,' which may be represented by 8 bits. The DMA 104 may transfer '01000001' as part of a single transfer that is 8 bits or larger. Since the DMA can transfer 32 bits data for a data bus size of 32 bits, between one and four ASCII character codes may be transferred in one cycle. The DMA 104 may be configured by the CPU 102 to perform the transfers.

The display controller 110 may be configured to process the formatted data that is received from the DMA 104. The display controller 110 may be configured by the CPU 102 to perform the processing. In some implementations, the display controller 110 uses look-up tables to map the received character codes to the corresponding characters. For example, the display controller 110 may use ASCII tables to map ASCII character codes to the corresponding ASCII characters. The look-up tables may be hardcoded in the display controller 110. Alternatively, the look-up tables may be stored in some other module of the computing system 100 that is accessible to the display controller 110.

Each character may include several symbols. Upon translating a character code to the corresponding character, the display controller 110 identifies the symbols associated with the character, and the segments included in the symbols. Then the display controller 110 updates the display bitmap in the display memory 112 to make the relevant segments visible, such that the character is displayed on the digital display 108.

The CPU 102 may be set to sleep or idle more, or perform some function unrelated to the display of characters, once the DMA 104 is configured to transfer the formatted data and the display controller 110 is configured to process the transfers from the DMA 104. Then the display controller 110 interacts with the DMA 104 directly using the "rdy" signal 114 to receive data from the DMA 104 and display on the digital display 108.

The dimensions of the digital display 108 may permit N number of characters to be displayed at a time, where N is an integer. Therefore, a section of a character string that may be simultaneously displayed is of length N.

In some implementations, a character string may be displayed in sequence, as mentioned previously. In such implementations, each N characters of the string are displayed on the digital display 108 in sequence according to the display rate of the digital display 108. To display the entire string, the DMA 104 transfers the string information in several transfers, with each transfer being limited to information on a subset of the characters.

As mentioned previously, the number of characters that may be transferred in one cycle is based on the size of the transfer (that is, size of the DMA data bus), and the number of bits used to represent the code for each character. For the example given previously with a 32 bit data bus and 8-bit ASCII characters, each transfer may include 3 character codes, which use 24 bits. The remaining 8 bits of the transfer may include other information that is used by the display controller 110 to process the transfer. Alternatively, each transfer may include 4 character codes, which use up all 32 bits. For a string of 9 characters, and each transfer including 3 character codes, the DMA 104 can transfer information on the entire string in 3 transfers. The display can be repeated if DMA 104 repeats the entire character string transfer.

The display controller 110 controls the DMA transfer with the "rdy" signal 114 to pause the transfers. Upon receiving the data in one transfer cycle, the display controller 110 processes the received N character codes. The display controller 110 (i) maps the codes to the characters using the look-up tables, (ii) updates the display bitmap based on the identified characters, and (iii) turns segments on or off based on the refreshed display bitmap.

After each N character codes are received in one transfer cycle, the display controller 110 pulls the signal 114 low and waits for a configurable amount of time (which is measured by an internal counter) to pull-up the signal 114 in order to request the next transfer for displaying the next characters in the string.

In some implementations, a character string may be displayed in a scrolling mode. In such implementations, the first N characters of the string are received by the display controller 110 and displayed on the digital display 108. After a pause based on the display rate, the first character of the string is skipped and next N characters are displayed. And so on till the entire string is displayed.

To scroll a character string, the DMA 104 repeats the transfer of the entire character string P times, where P is an integer. P is determined based on the dimensions of the digital display 108 and the total length of the character string to be displayed. Since the dimensions of the digital display 108 may be smaller than the dimensions needed for displaying the entire character string at one time, the display controller 110 may display a subset of the information received from the DMA 104. The size of subset corresponds to the number of characters that may be displayed on the digital display 108 at one time. In some implementations, this number may be configurable in the display controller 110.

For example, the dimensions of the digital display 108 may be such that the digital display 108 is configured to display 3 characters at a time. The string to be displayed may include 5 characters. In each step, that is, each time the digital display 108 is updated, 3 characters of the string are displayed. The display controller 110 removes the first character from the previous step (also referred to as the "head"), but repeats the second and third characters from the previous step. In addition, a new character is added as the trailing character to be displayed. The new character that is added is selected from the data received from the DMA 104. Any additional string characters that may have been received from the DMA 104 (also referred to as the "tail") are ignored by the display controller 110. In this manner, to display the entire string, the total number of steps is 3. Therefore, P is 3, that is, the DMA repeats the transfer of the string 3 times.

After one round of transfers of the character string, the display controller 110 pulls the "rdy" signal 114 low. The display controller 110 waits for the predetermined amount of time, which is based on the display rate, before it pulls the "rdy" signal 114 high. Then the DMA 104 is released for performing the next round of transfers for the character string.

The character that is considered the "head" depends on the direction in which the string is scrolled. For example, if the string is scrolled right to left, then the leftmost displayed character is the "head" character, and this character is removed the next time the digital display 108 is updated. However, if the string is scrolled from left to right, then the rightmost displayed character is the "head" character. The direction in which the string is scrolled may be a parameter of the display controller 110 that is configurable.

In accordance with the above, the DMA controller 104 and the display controller 110 communicate using the signal 114 to automate the presentation of symbols or strings of characters on the digital display 108, without involving the CPU 102 during the process of transferring and displaying the data. Therefore, the CPU 102 may be idle or performing some other operation unrelated to the digital display 108 while a display operation is performed. In some implementations, the CPU 102 may be in a sleep mode.

By avoiding CPU intervention for automating the transfer and display of data on the digital display 108, CPU processing may be reduced, leading to reduced power consumption. The computing system 100 may be used for implementing a very low power microcontroller with a display.

Alternatively, the CPU may be freed up for other operations, leading to increased performance throughput of the computing system 100. Since one layer of control for updating the display memory 112 is removed, higher performance for digital display 108 also may be realized, such as faster refreshes. The may be particularly useful in cases where the display may be active for a long time, such as running an animation repeatedly.

In addition, the above architecture does not use additional hardware logic in the display controller 110 or the DMA 104. Therefore, the cost for the computing system 100 may be less compared to other architectures, for example, systems that embed dedicated logic in the display controller.

While the architecture of the computing system 100 has been described using the DMA 104 for transferring data to the display controller 110, it will be understood that this is one example of automating the digital display 108 that may be performed without CPU intervention. For example, the computing system 100 may include one or more additional master hardware modules that may be configured for data transfer. The DMA 104 may interact with the additional master hardware modules for transferring display data directly from the system memory to the display memory 112 without involving the CPU. Consequently, the additional hardware modules may control the display controller 110 for automating the digital display 108 without CPU intervention.

Figure 2:
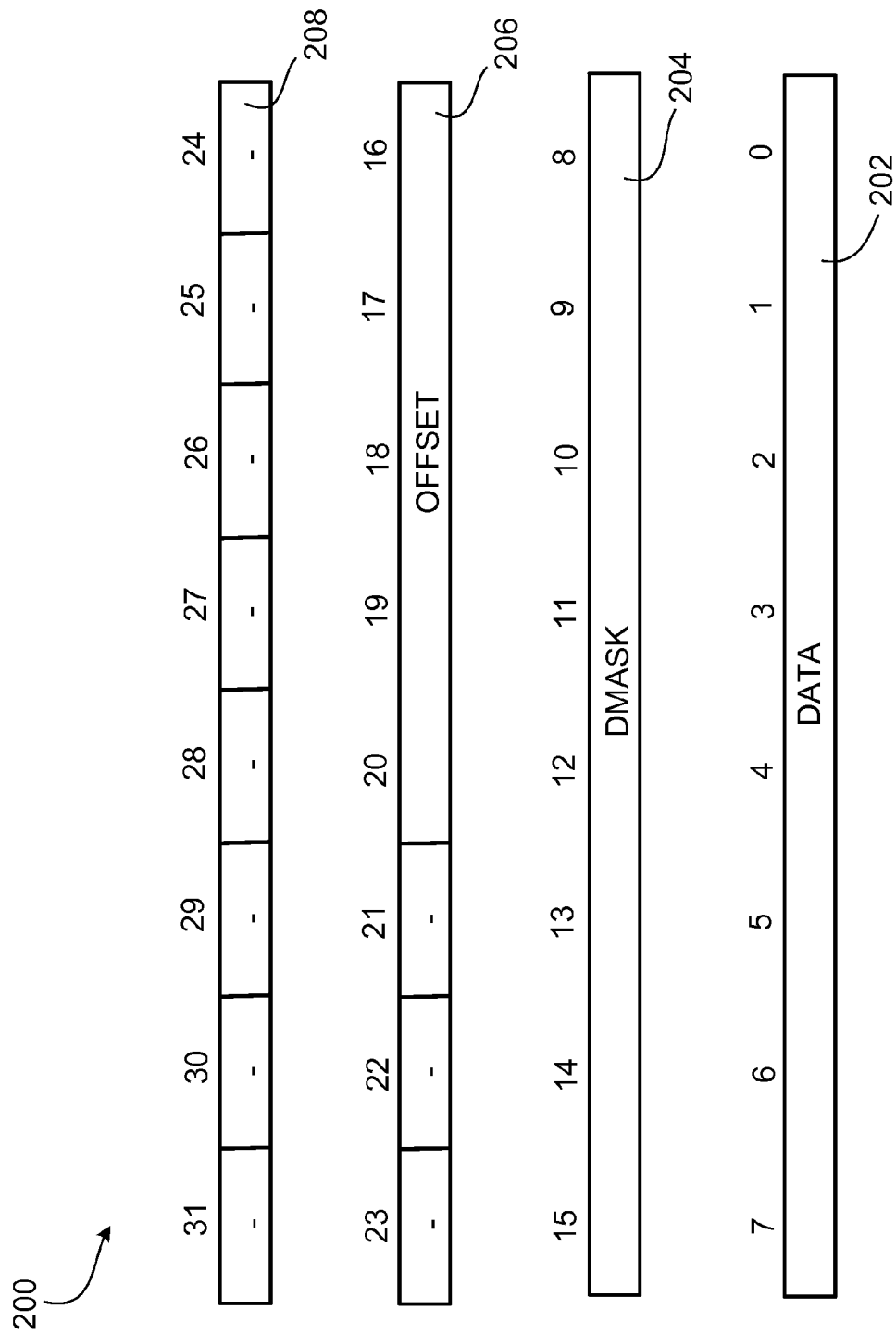
FIG. 2 illustrates an exemplary register map for the indirect access mechanism in an automated digital display.

FIG. 2 illustrates an exemplary register map 200 for the indirect access mechanism in an automated digital display. The register map 200 may represent a symbol bitmap that is transferred by the DMA 104 in one transfer cycle. The following describes the register map 200 as being implemented by the computing system 100. However, the register map 200 also may be implemented by other systems.

The register map 200 includes a DATA field 202, a DMASK field 204 and an OFFSET field 206. Some of the bits in the register map, such as 208, may be empty, that is, unmapped to any field.

FIG. 2 shows a 32 bit implementation of the register map 200, with the bits numbered 0 through 31. The 32 bit implementation may be for a 32 bit data bus used by the DMA 104. However, the register map 200 may be other sizes, depending on the data bus size. For example, for a 64-bit data bus, the register map 200 may be 64 bits, while for a 128-bit data bus the register map 200 may be 128 bits.

The fields 202, 204 and 206 represent parameters that are used to update a section of the digital display 108 in the indirect access mechanism. The DATA field 202 includes the value for each segment in a group of segments. The size of the DATA field 202 is S, that is, the size of a group of segments. As described previously, for a 32-bit implementation, the size of the DATA field 202 may be 8 bits.

The DMASK field 204 includes the value of a data mask that allows a subset of the segments in a group of segments to be updated. Each bit included in DMASK 204 is a mask for a corresponding bit in DATA field 202. For example, the first bit in DMASK field 204 (bit numbered 8 in the register map 200) is a mask for the first bit in DATA field 202 (bit numbered 0 in the register map 200). When DMASK[x]=1, where x denotes a bit in DMASK 204, DATA[x] is masked, that is, not written to the digital display 108. For example, when the second bit in DMASK field 204 (bit numbered 9 in the register map 200) is 1 (DMASK[2]=1), the second bit in DATA field 202 (DATA [2]) is not written to the digital display 108. Therefore, the corresponding segment in display memory 112 is not updated.

The OFFSET field 206 includes the value of an offset for selecting an S-sized group of flip-flops in the display memory 112. In some implementations, the offset is measured from the first S-sized group of segments. For example, the offset for the first group of segments is zero. The number of bits in the OFFSET field 206 is based on the range of values of the offset, which in turn may depend on the number of S-sized groups. The number of bits may range from a few bits (for a small number of groups of segments) to several bytes (for a large number of groups of segments).

In some implementations of the indirect access mechanism, the display controller 110 receives a symbol bitmap corresponding to the register map 200 in one transfer cycle. The display controller 110 decodes the OFFSET field 206 to pre-select a group of S flip-flops in the display memory 112, which correspond to the segments that are to be modified. A single such group of flip-flops are pre-selected in one cycle. Then the display controller 110 processes the DMASK field 204 to select which of the pre-selected flip-flops will be updated. The D-input of each flip-flop in the pre-selected group is connected to a DATA bus input, such that the flip-flops that are to be updated based on the DMASK field 204 are modified based on the values of the corresponding bits in the DATA field 202.

Figure 3:
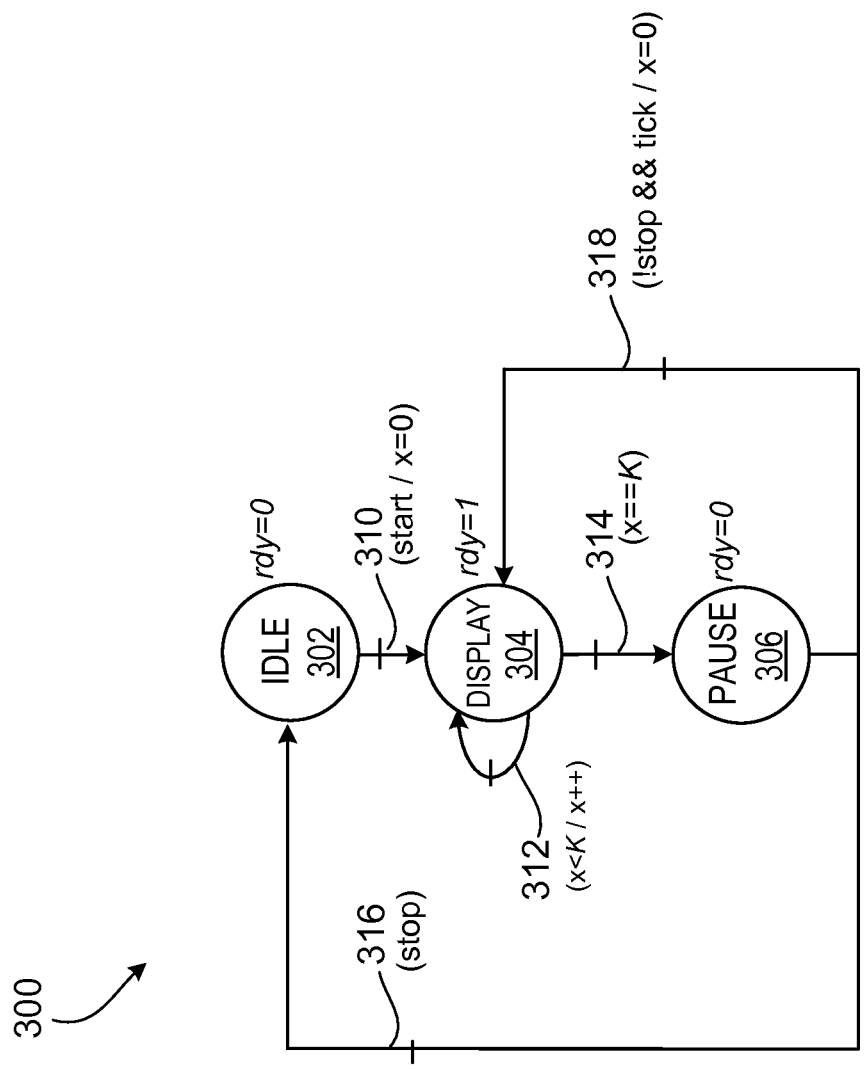
FIG. 3 shows an exemplary state machine illustrating steps executed by a display controller for automating a digital display.

FIG. 3 shows an exemplary state machine 300 illustrating steps executed by a display controller for automating a digital display. The state machine 300 may represent the states of the display controller 110 to animate symbols in a sequential mechanism. Alternatively, or in addition to the above, the state machine 300 may represent the states of the display controller 110 to display a string of characters in sequence. The following describes the state machine 300 as being implemented by the computing system 100. However, the state machine 300 also may be implemented by other systems.

The state machine 300 includes states 302-306, which indicate different states of operation of the display controller 110. The state machine 300 also includes state transitions 310-318 that represent triggering events or conditions for moving the operation of the display controller 110 from one state to another. The states and state transitions may be implemented by instructions that are embedded in a non-transitory storage medium associated with the display controller 110. The instructions may be executed by one or more processors associated with the display controller 110.

A transition may be a synchronous transition, in which case the transition is controlled by a clock signal. The clock signal may be provided by an internal counter of the display controller 110. A synchronous transition is indicated by a bar corresponding to the transition. For example, 310 is a synchronous transition.

Each of the transitions 310-318 is associated with one or more conditions. In addition, each of the transitions 310-318 may be associated with one or more actions. The conditions and actions that are associated with each transition is represented in the state machine 300 within parentheses as (condition/action) corresponding to the particular transition. For example, transition 310 has "(start/x=0)" associated with it. In this case, "start" is the condition for which the transition 310 from state 302 to 304 occurs; and the action taken for the transition is "x=0," that is, assigning a value zero to x. In this context, "==" is used as a test for a condition, while "=" is used as an assignment for an action.

When the display controller 110 is not displaying data on the digital display 108, the display controller 110 is in the IDLE state 302. While in state 302, the display controller 110 may be in a sleep mode, or idle mode, in some other reduced power state and not performing any operation related to the display. When the display controller 110 is in the state 302, the 'rdy' signal 114 is pulled low, which is indicated by "rdy=0." The signal 114 being low prevents the DMA 104 from transferring any new symbol bitmap, or character codes as appropriate, to the display controller 110. The DMA 104 stalls and waits for a request from the display controller 110.

When the display controller 110 is ready to manage the digital display 108 for animating the next symbol, or for displaying the next sequence of characters included in a string, the display controller 110 transitions to the DISPLAY state 304. The state transition is indicated by 310 ("start"), at which time the data x that is received by the display controller 110 from the DMA 104 is 0. When animating symbols, x may represent the cumulative amount of data received. When displaying character strings, x may represent the total number of characters decoded.

While in the state 304, the display controller 110 pulls 'rdy' signal 114 high ("rdy=1"), which is effectively a request signal to the DMA 104 that the display controller 110 is ready to receive the next data transfer. Consequently, the DMA 104 transfers display data for the next display. As described previously, the amount of data transferred by the DMA 104 is dependent on the size of the DMA data bus. The transfer may be a single symbol bitmap, for example, when the display controller 110 is animating symbols on the digital display 108. Alternatively, the transfer may include one or more character codes, for example, when the display controller 110 is displaying a string of characters in sequence on the digital display 108.

When the display is related to symbol animation, upon receiving the data from the DMA 104, the display controller 110 updates the display bitmap in the display memory 112 with the newly-received symbol bitmap. The corresponding segments in the digital display 108 are accordingly updated.

When the display is related to a character string, upon receiving the data from the DMA 104, the display controller 110 maps the received character codes to characters using look-up tables, updates the display bitmap based on the identified characters, and turns segments on or off based on the refreshed display bitmap.

In some implementations, K amount of data is to be displayed in total. For example, when the state machine 300 is related to symbol animation, the symbol to be animated may be of size K. The display controller 110 adds the data received in the transfer to the cumulative amount of data x, and checks whether x has reached size K. If x is less than K, the display controller 110 transitions back in to the state 304, which is indicated by the transition 312.

Alternatively, when the state machine 300 is related to displaying characters in a string in sequence, the total number of characters that can be displayed at one time is K. The display controller 110 adds the characters decoded corresponding to the transfer to the total number x of decoded characters, and checks whether x has reached size K. If x is less than K, the display controller 110 transitions back in to the state 304, which is indicated by the transition 312.

The 'rdy' signal being high, the DMA 104 performs the next transfer. In the case of animating symbols, the display controller 110 refreshes the display bitmap with the symbol bitmap from the current transfer, and the corresponding segments in the digital display 108 are updated. In the case of displaying characters, the display controller 110 decodes the received data into characters and enables the corresponding segments in the digital display 108.

The display controller 110 stays in state 304 until x reaches size K. When the display controller 110 determines that x==K, the display controller 110 performs the transition 314 and moves to the PAUSE state 306. In the state 306, the display controller 110 pulls the 'rdy' signal low ("rdy=0"). The display controller 110 pauses, that is, waits, in the state 306 for a predetermined amount of time, which is measured by an internal counter and represented by tick. The predetermined amount of time may be configurable by the user, based on the desired display rate of the digital display 108.

When the predetermined amount time is over, that is, tick reaches the internal counter overflow, the display controller 110 checks whether there are more data to be displayed. If there is no more data to be displayed, the display controller 110 stops updating the display bitmap and performs transition 316 to the IDLE state 302.

On the other hand, if there is more data to be displayed, the display controller 110 transitions back to the DISPLAY state 304. The state transition is indicated by 318, at which time x is reset to 0. The display controller 110 pulls the 'rdy' signal high and prepares to receive the next transfer to display the next bitmap or the next characters in the string as the case may be, as described previously.

In some implementations, the implementation of the state machine 300 for symbol animation may be distinct from the implementation of the state machine 300 for displaying characters in a string in sequence. However, in other implementations, the same state machine 300 may be implemented for both symbol animation and displaying characters in a string in sequence. In such implementations, the display controller 110 may be configured to handle both kinds of data transfers and process the data as appropriate based on which of the two different display types is being performed.

Figure 4:
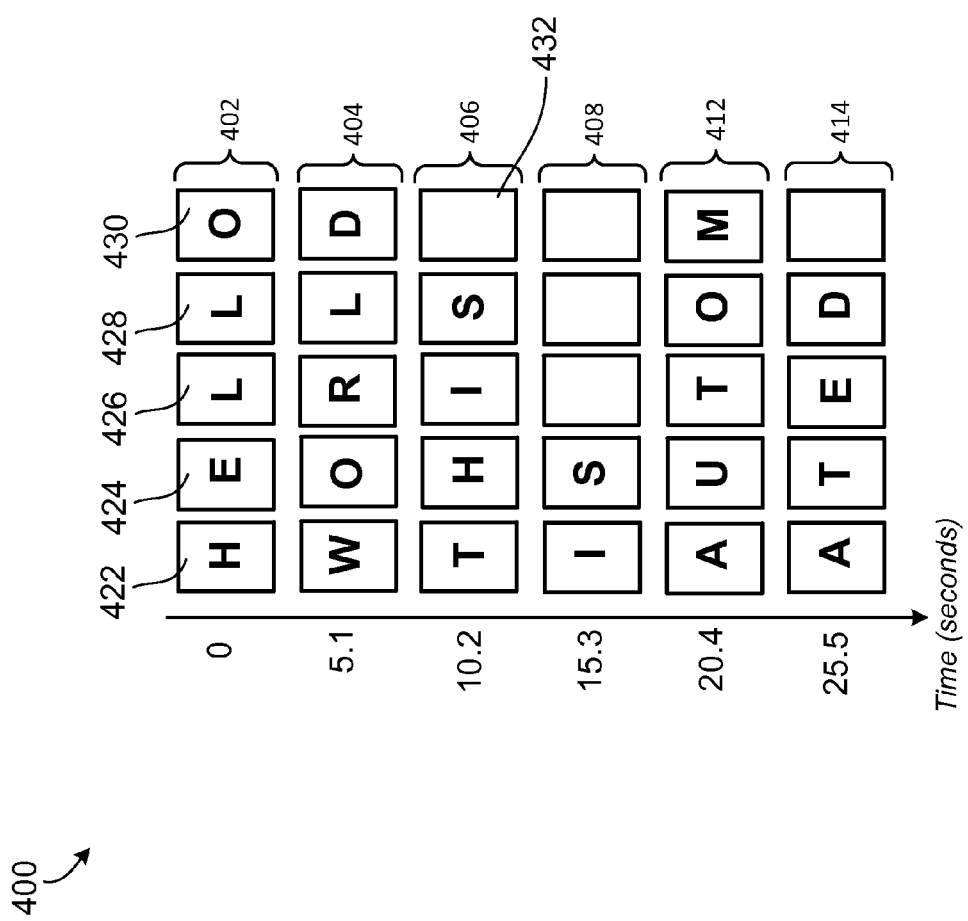
FIG. 4 illustrates an exemplary display of a string of characters displayed in sequence.

FIG. 4 illustrates an exemplary display 400 of a string of characters displayed in sequence. The string of characters may be displayed by the display controller 110 on the digital display 108 using instructions executed based on the state machine 300. Accordingly, the following describes the display 400 with regard to computing system 100. However, the display 400 also may be performed by other systems.

The display 400 includes sequences 402-414 and characters 422-432. Each sequence illustrates the total number of characters that may be displayed on the digital display 108. Therefore, the sequences 402-414 also may be taken to represent views of the digital display 108 at different points in time, as indicated by the time markers on the left. As shown by the example, the digital display 108 may be configured to display 5 characters at a time.

In the example shown, the character string to be displayed is "HELLOWORLDTHIS IS AUTOMATED." In the first round of transfers, the display controller 110 receives data corresponding to the first 5 characters, comprising the substring "HELLO." Based on the DMA data bus size, and consequently, the size of the data that may be transferred in one transfer, the display controller 110 may receive codes for all 5 characters in one transfer, or it may receive the codes for the 5 characters in multiple transfers, but while the display controller 110 is in state DISPLAY 304.

Upon processing the received data, the display controller 110 updates the display bitmap and consequently, the characters 'H' 422, 'E' 424, 'L' 426, 'L' 428 and 'O' 430 are displayed together on the digital display 108. Then the display controller 110 waits for a period of time (pulling "rdy" signal 114 low) based on the display rate. During the wait period, the characters most recently displayed remain static on the screen. For example, the display rate may be 5.1 seconds, as shown in the example. Therefore, the first sequence 402 stays on the screen for roughly 5 seconds.

When the wait period is over, the display controller 110 requests the next transfer from the DMA 104 (pulling "rdy" signal 114 high). When the transfer is received, the display controller 110 processes the transfer and updates the display bitmap. In updating the display bitmap, the display controller 110 removes the previous sequence and replaces with the sequence received in the present transfer. For example, at approximately 5.1 seconds, the display controller 110 displays a new sequence 404 on the digital display 108.

In this manner, the display controller 110 updates the display bitmap and refreshes the digital display 108 at the display rate, showing substrings of the entire string sequentially as 406, 408, 412 and 414. Some of the characters in a sequence may be blank or space, such as 432, which are displayed as such.

Figure 5:
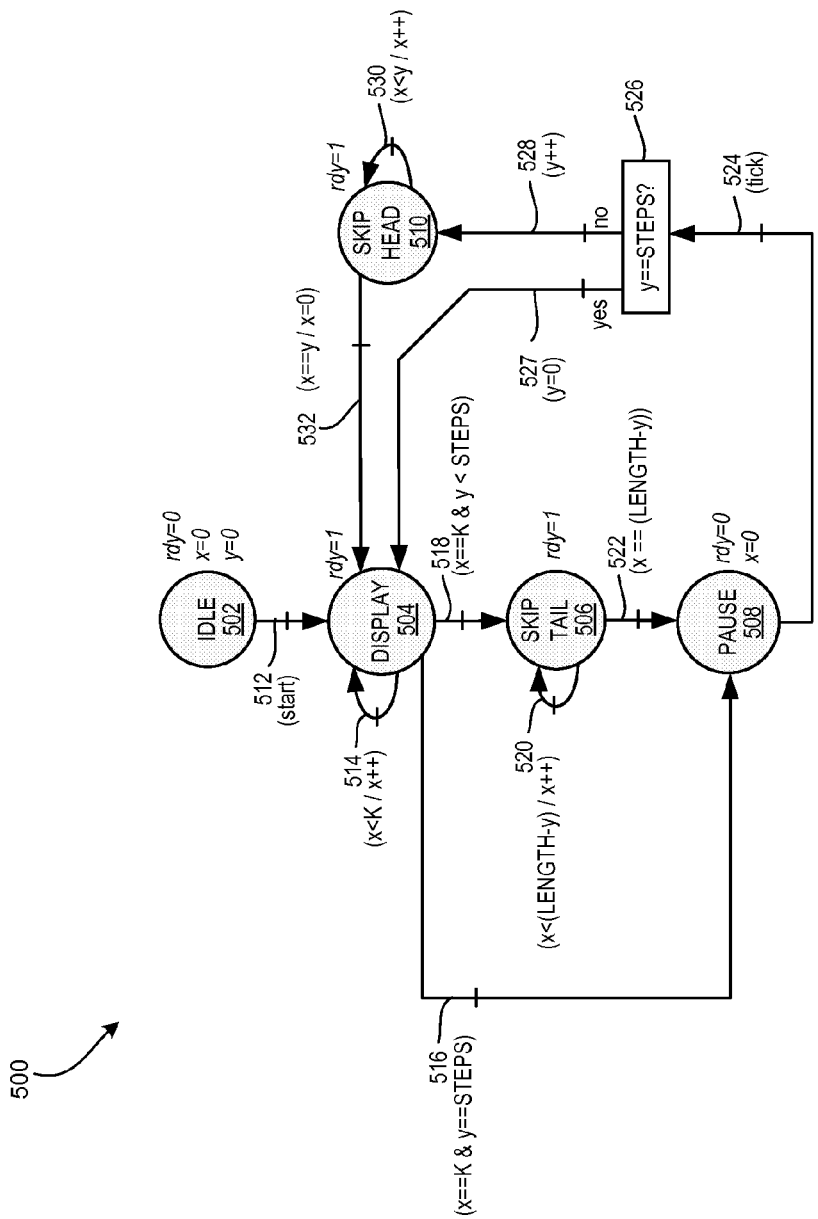
FIG. 5 shows an exemplary state machine illustrating steps executed by a display controller for automating a digital display for displaying a character string in scrolling mode.

FIG. 5 shows an exemplary state machine 500 illustrating steps executed by a display controller for automating a digital display for displaying a character string in scrolling mode. The state machine 500 may represent the states of the display controller 110 to display a scrolling string of characters. Accordingly, the following describes the state machine 500 as being implemented by the computing system 100. However, the state machine 500 also may be implemented by other systems.

The state machine 500 includes states 502-510, which indicate different states of operation of the display controller 110. State machine 500 also includes state transitions 512-532 that represent conditions for moving the operation of the display controller 110 from one state to another. A transition may be a synchronous transition, which is indicated by a bar corresponding to the transition. For example, 512 is a synchronous transition. The states and state transitions may be implemented by instructions that are embedded in a non-transitory storage medium associated with the display controller 110. The instructions may be executed by one or more processors associated with the display controller 110.

Each of the transitions 512-532 is associated with one or more conditions. In addition, each of the transitions 512-532 may be associated with one or more actions. The conditions and actions that are associated with each transition is represented in the state machine 500 within parentheses as "(condition/action)" corresponding to the particular transition. For example, transition 512 has "start" associated with it. In this case, "start" is the condition for which the transition 512 from state 502 to 504 occurs. As another example, the transition 514 has "x<K/x++" associated with it. In this case, "x<K" is the condition for which the transition 514 takes place; and the action taken during the transition is "x++" that is, incrementing the value of x by 1. In this context, "==" is used as a test for a condition, while "=" is used as an assignment for an action.

In the state machine 500 and the following description, x represents the number of characters decoded at the display controller 110 based on the information received from the DMA 104. y represents the current step in scrolling the character string in one round of scrolling, where one round of scrolling indicates displaying the entire string once in scrolling mode. In some implementations, steps are numbered starting from zero, such that the first step is step 0 (y=0). In such implementations, y also represents the number of head characters to skip for the current step. K represents the number of characters that may be displayed on the digital display 108 in each step, and STEPS represents the total number of steps needed for scrolling the entire character string in one round, and thus STEPS represents the number of different displays for the character string. Therefore, when y==STEPS, the entire character string has been displayed in the particular round. LENGTH represents the length of the character string, that is, the total number of characters in the string. tick represents an event corresponding to the display refresh rate.

When the display controller 110 is not displaying data on the digital display 108, the display controller 110 may be in the IDLE state 502. While in state 502, the display controller 110 may be in a sleep mode, or idle mode, or in some other reduced power state. In the state 502, the display controller 110 may just refresh the current display, but may not update the characters that are displayed. When the display controller 110 is in the state 502, the 'rdy' signal 114 is pulled low, which is indicated by "rdy=0." The signal 114 being low prevents the DMA 104 from transferring any new character codes to the display controller 110. In the state 502, the total number of characters x that have been decoded in the present cycle is zero and the current step y is also zero, which are indicated by "x=0" and "y=0" respectively. At this stage, the DMA 104 stalls and waits for a request from the display controller 110. The request corresponds to the signal 114 being high, that is, the condition "rdy==1".

When the display controller 110 is ready for displaying the string on the digital display 108 as a scrolling string, the display controller 110 transitions to the DISPLAY state 504. The state transition is indicated by 512 ("start").

While in the state 504, the display controller 110 pulls the 'rdy' signal 114 high ("rdy=1"). Consequently, the DMA 104 transfers encoded characters for the next display. Upon receiving the data from the DMA 104, the display controller 110 maps the received character codes to characters using look-up tables. Since the total number of characters that can be displayed at one time in a step is K, the display controller 110 checks whether the number of decoded characters x has reached size K. If x is less than K, the display controller 110 transitions back in to the state 504 for decoding the next character, which is indicated by the transition 514. The 'rdy' signal being high, the DMA 104 performs the next transfer. The display controller 110 decodes the received character and adds the character to the list of characters to be displayed. When x reaches K, the display controller 110 updates the display bitmap based on the decoded list characters, and turns segments on or off based on the refreshed display bitmap. Consequently, the subset of the string that is to be scrolled in the present step is displayed on the digital display 108.

The display controller 110 stays in state 504 until x reaches size K. When the display controller 110 determines that x==K, the display controller 110 checks whether the current step y in displaying the full string is same as the total number of steps needed (y==STEPS), that is, whether the full string has been displayed for the particular round of display. If the display controller 110 determines that the full string has been displayed, the display controller 110 performs the transition 516 and moves to the PAUSE state 508. On the other hand, if the display controller 110 determines that the full string has not been displayed, the display controller 110 performs the transition 518 and moves to the SKIP TAIL state 506.

In the state 506, the 'rdy' signal is still high ("rdy=1"). Consequently, the display controller 110 receives further data transfers from the DMA 104 corresponding to the remaining characters of the string (the "tail" of the string). This is because in the scrolling mode, the display controller 110 receives the entire string in every round of transfer, but displays a subsection of the string in each round.

Since K characters are already displayed for the present step, the display controller 110 skips, that is, does not display, the remaining characters of the string, which are received while in state 506. In some implementations, as the display controller 110 decodes additional characters while in state 506, the display controller 110 checks whether there are more characters of the string remaining to be decoded. The remaining characters are given by LENGTH-y. This is because y also may be taken to indicate the number head characters skipped for scrolling the character string, which is based on the number of steps already executed, as indicated previously.

If the display controller 110 determines that the number of characters decoded x is less than the remaining characters of the string, the display controller 110 transitions back to the state 506 (this is indicated by 520) and decodes the next character transferred from the DMA 104, skipping the decoded characters. When the remaining character of the string have been decoded, that is, x==LENGTH-y, the display controller 110 performs the transition 522 and moves to the PAUSE state 508.

In some implementations, the last character in a character string is the null character ('\0'). In such implementations, for every character decoded while in the state 506, the display controller 110 checks whether the null character is received. If the display controller 110 determines that the null character is not received in a transfer, the display controller 110 transitions back to the state 506 and processes the next transfer from the DMA 104, skipping the decoded characters. When the null character is received (data=='\0'), the display controller 110 transitions to the PAUSE state 508.

In the PAUSE state 508, the display controller 110 pulls the 'rdy' signal low ("rdy=0"). The current step in present round of displaying the full character string is completed at this stage, and therefore the number of characters decoded x is reset to zero, as indicated by "x=0." The display controller 110 pauses, that is, waits, in the state 508 for a predetermined amount of time, which is measured by the internal counter. The predetermined amount of time may be configurable by the user, based on the desired display rate of the digital display 108.

When the predetermined amount time is over, that is, the internal counter overflows, which is represented by tick, the display controller 110 checks whether y has reached the total number of steps STEPS needed for displaying the full string in one round, that is, whether the entire string has been scrolled once at this stage, as indicated by the condition 526. This check may be performed, for example, when the entire string is scrolled multiple times.

If the display controller 110 determines that y has reached the total number of steps STEPS, then the full character string has been displayed in the present round. The display controller 110 resets y ("y=0") and performs the transition 527 to the DISPLAY state 504. At this stage, the display controller 110 repeats the last K characters on the display 108, and performs the transition 516 to the PAUSE state 508, repeating the sequence.

On the other hand, if there is more data to be displayed, the display controller 110 transitions initiates the next step in the present round by incrementing y ("y++") and moves to the SKIP HEAD state 510. The state transition is indicated by 528. In the state 510, the display controller 110 pulls the 'rdy' signal high to receive the character transfers for the new step. As data is received from the DMA 104, the display controller 110 decodes the characters and increments x, checking whether the first y characters have been decoded. The display controller 110 skips the first or "head" y characters received and transitions back into the state 510, as indicated by the transition 530. For example, if in step y=3, the display controller 110 skips the first three characters that are decoded (this may be the case, for example, in implementations where the first step is numbered step 0, that is, y starts at 0).

When the number of characters decoded x reaches the current step ("x==y"), the display controller 110 transitions to the DISPLAY state 504. The transition is indicated by 532, during which x is reset to zero ("x=0"). For example, when the current step is 3 (y==3), the display controller 110 stays in state 510 for the first, second and third decoded characters, which are skipped since at each step one additional head character is skipped to make a scrolling effect. The fourth character that is decoded (at this stage, x==y==3) is not a "head" character that will be skipped, and the display controller 110 transitions to the DISPLAY state 504. At that stage, the display controller 110 proceeds to display the next K characters that are received from the DMA 104 and repeat the sequence of state machine transitions, as described in the previous sections.

Figures 6A, 6B:
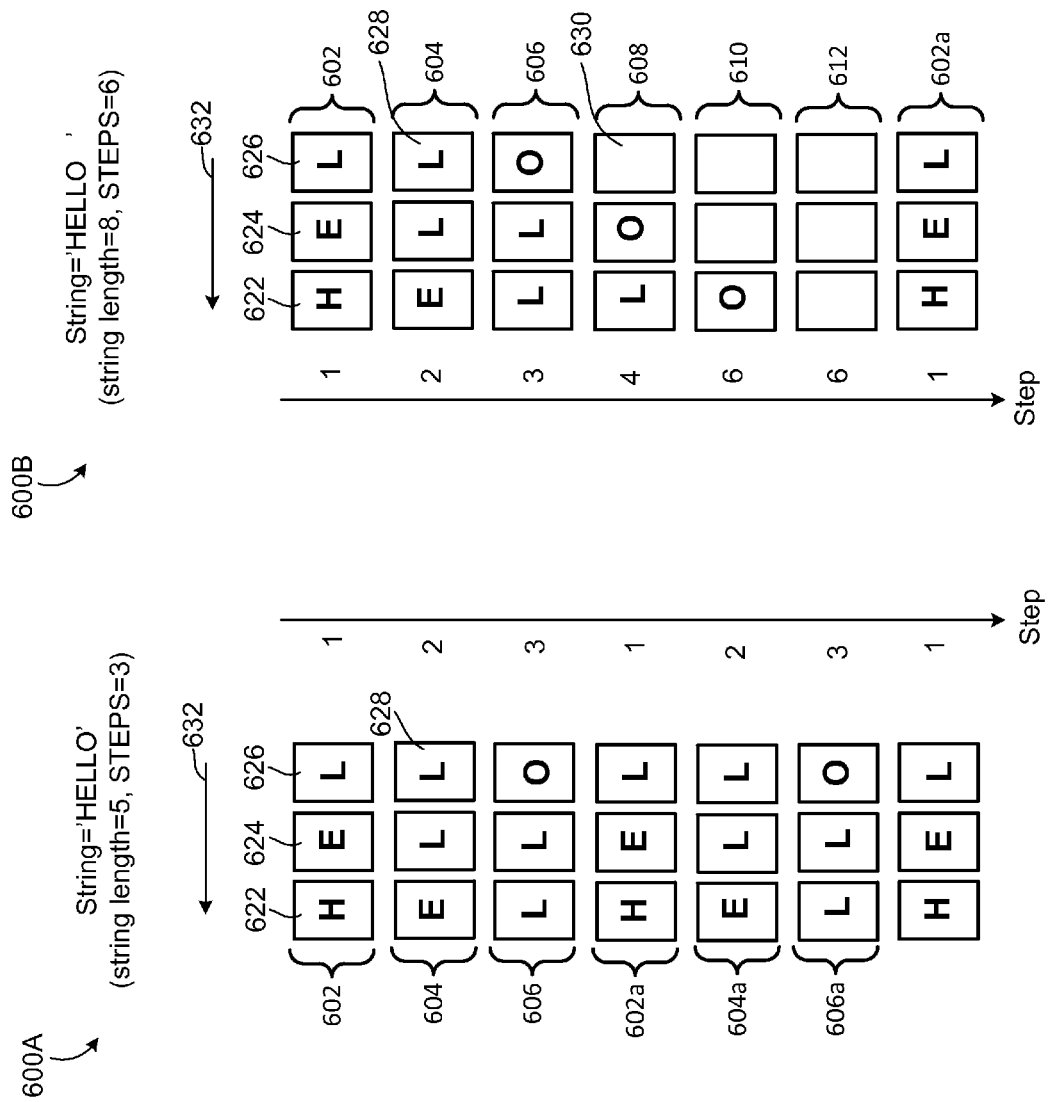
FIGS. 6A and 6B illustrate exemplary displays of character strings that are displayed in scrolling mode.

FIG. 6A illustrates an exemplary display 600A in which a string "HELLO" that is 5 characters in length is scrolled 3 characters at a time. The display 600A includes sequences 602-606, 602a-606a and characters 622-628. The direction of scrolling is indicated by 632.

Each sequence, such as 602, illustrates the total number of characters that may be displayed on the digital display 108 in each step. Therefore, the sequences also may be taken to represent views of the digital display 108 at different steps, as indicated by the step markers on the right. As shown by the example, the digital display 108 may be configured to display 3 characters at a time.

In each round of transfers, the display controller 110 receives character codes corresponding to the entire string. Based on the DMA data bus size, and consequently, the size of the data that may be transferred in one transfer, the DMA 104 transfers the character codes in one or more transfers. The display controller 110 may receive codes for all 5 characters in one transfer, or it may receive the codes for the 5 characters in multiple transfers.

For the first sequence 602 that is displayed, upon processing the received data, the display controller 110 updates the display bitmap and consequently, the characters 'H' 622, 'E' 624 and 'L' 626 are displayed. At this stage, the display controller 110 may be in state 504. Then the display controller 110 transitions to state 506 and skips the remaining decoded characters of the string.

Then the display controller 110 waits for a period of time (pulling "rdy" signal 114 low) based on the display rate. When the wait period is over, the display controller 110 increments the number of steps executed M to 1, moves to the state 510, and receives the entire string in the next round. In this round, while in state 510, the display controller 110 skips the first character (y=M=1) of the string before moving to state 504, when it updates the display bitmap with the next sequence 604. The sequence 604 does not include the "head" character 622 from sequence 602 (the scrolling is from right to left, as indicated by 632), but includes the remaining characters 624 and 626. In addition, the sequence 604 includes a new trailing character 'L' 628.

In the next display step (step 3), M=3 and consequently the first two characters 622 and 624 of the string are removed from the displayed sequence 606. The total number of steps needed for displaying the string "HELLO" is 3; therefore, the entire string is scrolled by step 3.

In this manner, the display controller 110 updates the display bitmap in each step by displaying a sequence that repeats characters from the previous sequence excluding the "head" character. This provides the sensation of a "scrolling display."

In some implementations, the scrolling may be repeated, in which case the display controller 110 repeats the display after the entire string is displayed (setting M=0). For example, sequences 602a-606a repeat the string in 3 steps, in a manner similar to sequences 602-606. The number of times a string may be scrolled is user-configurable. In some implementations, a string may be scrolled indefinitely, in which case the sequences are repeated indefinitely.

In order to repeat display a string, the display controller 110 requests the DMA 104 to repeat transfer of data that has been sent previously. In such cases, the DMA 104 may be configured to operate in a loop.

FIG. 6B illustrates an exemplary display 600B in which a string "HELLO" that is 8 characters in length including 3 trailing whitespace characters. The string in the display 600B is scrolled 3 characters at a time. The display 600A includes sequences 602-612, 602a and characters 622-630. The direction of scrolling is indicated by 632.

The display 600B is similar to the display 600A in some respects. Each sequence, such as 602, illustrates the total number of characters that may be displayed on the digital display 108 in each step. However, the string that is to be scrolled is longer, and therefore the total number of steps used is larger. For example, the display 600B uses 6 steps in all to scroll the entire string. Consequently, the total number of sequences that are used is higher. For example, 600B uses 6 sequences 602-612 to scroll the entire string, while 600A uses 3 sequences 602-606.

Some of the characters, such as 630, are whitespace, which are displayed as such. Some sequences may be composed entirely of whitespace characters, for example 612.

Similar to the display 600A, the string in 600B may be scrolled repeatedly. Therefore, once the entire string is completed scrolling in sequence 612, the characters displayed in a sequence may be repeated. For example, sequence 602a, which follows the last sequence 612 in the previous "round" of displaying the entire character string, is the first sequence of the next round. Sequence 602a is identical to the sequence 602, which was the first sequence in the previous round.

In the manner described above, using the scrolling mode, different types of string animation may be achieved using the digital display 108 without CPU intervention. Also as described previously, the computing system 100 may be used to display characters of a string in sequence, with one subset of displayed characters replaced by the new subset when the digital display 108 is refreshed. In addition, the computing system 100 may be used to animate symbols. The various kinds of display may be achieved without involving the CPU by the direct interaction of the display controller 110 and the DMA 104, which may lead to the realization of very low power, high performance microcontroller displays.

Updating the display using the DMA 104 may be beneficial from a re-use perspective: For example, such an implementation may save hardware logic, such as data and configuration registers in the peripheral and state machines. A user configuring the system would have to know how the DMA works, but would not need to learn the peripheral state machine specifics.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A device comprising:
a display controller configured to control a digital display, wherein information presented on the digital display includes one or more symbols, a symbol comprising one or more segments that are atomic elements of the digital display and represented by one or more bitmaps;
a memory configured to store data corresponding to the digital display; and
a direct memory access (DMA) controller configured to autonomously transfer the data from the memory directly to the display controller without central processing unit (CPU) intervention, the DMA controller comprising an interface configured to stall a transfer until a ready signal is received from the display controller, wherein the data included in a transfer is associated with a bitmap corresponding to a symbol, the bitmap including information on states of one or more segments comprising the symbol, an offset in display memory indicating a subset of the one or more segments addressed by the bitmap and a bit mask indicating segments in the subset that are to be updated, and wherein the state of a segment indicates whether the respective segment is displayed on or displayed off.

2. The device of claim 1, further comprising a CPU connected to the display controller, wherein the CPU is configured to be idle or performing an activity unrelated to the digital display at a time when the DMA controller is transferring the data from the memory to the display controller.

3. The device of claim 1, wherein the digital display includes a Liquid Crystal Display (LCD), and wherein the display controller includes an LCD controller.

4. The device of claim 1, further comprising the display memory that includes a bank of registers with each register associated with a segment, and wherein the offset is used for selecting a subset of the registers and the bit mask is used for determining which of the subset of the registers will be updated.

5. The device of claim 1, wherein a size of the offset ranges from a bit to a byte.

6. The device of claim 1, wherein a number of DMA transfers from the memory to the display controller corresponding to a symbol is based on a size of the symbol and an arrangement of one or more segments included in the symbol.

7. The device of claim 1, wherein the display controller is configured to perform operations comprising:
measuring an amount of time using an internal counter;
determining whether the measured amount of time has exceeded a threshold time value;
based on determining that the measured amount of time has exceeded the threshold time value, sending a ready signal to the DMA controller;
receiving an amount of data from the DMA controller; and
presenting, on the digital display, information corresponding to the amount of data received from the DMA controller.

8. The device of claim 7, wherein the threshold time value corresponds to a display rate of the digital display.

9. The device of claim 7, wherein the DMA controller is configured to perform operations comprising:
receiving the ready signal from the display controller; and
responsive to receiving the ready signal from the display controller, transferring the amount of data in a transfer cycle.

10. The device of claim 9, wherein the DMA controller is configured to receive a ready signal from additional peripheral controllers.

11. The device of claim 9, wherein the amount of data transferred in a transfer cycle is based on a size of a DMA data bus that is used for the transfer.

12. The device of claim 1, wherein the DMA controller is configured to transfer a total amount of data to be presented on the digital display in multiple transfer cycles when the total amount of data is greater than the amount transferred in a transfer cycle.

13. The device of claim 1, wherein the digital display is configured to present a string of characters that includes an ASCII character, and wherein the data included in a transfer corresponds to the ASCII character.

14. The device of claim 13, wherein the display controller includes look-up tables and is configured to translate the data corresponding to the ASCII character to a bitmap for the digital display using the look-up tables.

15. The device of claim 1, wherein the digital display is configured to present a string of characters using a sequential mode or a scrolling mode, and wherein the display controller is configured to perform operations comprising:
determining whether the display mode is the sequential mode or the scrolling mode; and
based on determining that the display mode is the sequential mode, displaying characters comprising a subset of the string, the characters included in a displayed subset being in sequence with the characters included in preceding displayed subsets.

16. The device of claim 1, wherein the digital display is configured to present a string of characters using a sequential mode or a scrolling mode, and wherein the display controller is configured to perform operations comprising:
determining whether the display mode is the sequential mode or the scrolling mode;
based on determining that the display mode is the scrolling mode, checking a number of steps into which the digital display is divided, the number of steps based on a length of the string of characters and a size of the digital display; and
repeating a display of the string of characters a number of times that is same as the number of steps.

17. The device of claim 16, wherein information on the number of steps is included in a configuration register associated with the display controller.

18. The device of claim 1, wherein the digital display is configured to present a string of characters using a sequential mode or a scrolling mode, and wherein the display controller is configured to perform operations comprising:
determining that the display mode is the scrolling mode;
obtaining a number of steps into which the digital display is divided, the number of steps based on a length of the string of characters and a size of the digital display; and
displaying successive sets of characters associated with the string, with each set repeating characters from the preceding set excluding an initial character included in the preceding set, wherein a number of the successive sets is same as the number of steps.

19. The device of claim 18, wherein a size of each set is based on a size of the digital display.

20. A system comprising:
a display controller configured to control a digital display, wherein information presented on the digital display includes one or more symbols, a symbol comprising one or more segments that are atomic elements of the digital display;
a memory configured to store data corresponding to the digital display; and
a direct memory access (DMA) controller configured to autonomously transfer the data from the memory directly to the display controller without central processing unit (CPU) intervention, the DMA controller comprising an interface configured to stall a transfer until a ready signal is received from the display controller,
wherein the data included in a transfer includes information associated with a symbol, and wherein a number of transfers from the memory to the display controller corresponding to a symbol is based on a size of the symbol and an arrangement of one or more segments included in the symbol.

21. The system of claim 20, further comprising a CPU connected to the display controller, wherein the CPU is configured to be idle or performing an activity unrelated to the digital display at a time when the DMA controller is transferring the data from the memory to the display controller.

22. The system of claim 20, wherein the display controller is configured to perform operations comprising:
- measuring an amount of time using an internal counter;
- determining whether the measured amount of time has exceeded a threshold time value;
- based on determining that the measured amount of time has exceeded the threshold time value, sending a ready signal to the DMA controller;
- receiving an amount of data from the DMA controller; and
- presenting, on the digital display, information corresponding to the amount of data received from the DMA controller.

* * * * *

UNITED STATES PATENT AND TRADEMARK OFFICE
CERTIFICATE OF CORRECTION

| | | |
|---|---|---|
| PATENT NO. | : 9,146,887 B2 | Page 1 of 1 |
| APPLICATION NO. | : 13/692531 | |
| DATED | : September 29, 2015 | |
| INVENTOR(S) | : Sebastien Jouin et al. | |

It is certified that error appears in the above-identified patent and that said Letters Patent is hereby corrected as shown below:

In the specification,

In Column 11 Line 42 please delete ""x-0,"that" and insert --"x-0," that--, therefor.

Signed and Sealed this
Sixteenth Day of February, 2016

Michelle K. Lee
*Director of the United States Patent and Trademark Office*